(12) United States Patent
Gallagher (10) Patent No.: US 7,343,626 B1
(45) Date of Patent: Mar. 11, 2008

(54) AUTOMATED DETECTION OF CROSS SITE SCRIPTING VULNERABILITIES

(75) Inventor: Thomas P. Gallagher, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1170 days.

(21) Appl. No.: 10/291,369

(22) Filed: Nov. 12, 2002

(51) Int. Cl.
*G06F 11/00* (2006.01)
*G06F 11/22* (2006.01)
*G06F 11/30* (2006.01)

(52) U.S. Cl. .......................... 726/25; 726/22; 726/23; 726/24; 726/26; 713/151; 713/165; 713/167; 713/188; 709/225; 707/3; 707/9

(58) Field of Classification Search ............ 726/22–26; 713/165–167, 188, 151; 707/3, 9; 709/225
See application file for complete search history.

(56) References Cited

U.S. PATENT DOCUMENTS

| | | | |
|---|---|---|---|
| 6,058,482 A * | 5/2000 | Liu | 726/23 |
| 6,311,278 B1 * | 10/2001 | Raanan et al. | 726/14 |
| 6,996,845 B1 * | 2/2006 | Hurst et al. | 726/25 |
| 2002/0004908 A1 * | 1/2002 | Galea | 713/200 |
| 2002/0010855 A1 * | 1/2002 | Reshef et al. | 713/164 |
| 2003/0037236 A1 * | 2/2003 | Simon et al. | 713/161 |
| 2003/0120947 A1 * | 6/2003 | Moore et al. | 713/200 |
| 2003/0159063 A1 * | 8/2003 | Apfelbaum et al. | 713/200 |

OTHER PUBLICATIONS

Amit Klein, Cross Site Scripting Explained, Jun. 2002, □□Sanctum Inc.*
Paul Lee, Cross-site scripting, Sep. 1, 2002, IBM Global Services.*
CERT Cordination Center, How to remove meta-characters from user-supplied data in scripts, Feb. 13, 1998.*
European Search Report (03023125.2 dated Apr. 24, 2006.
The Cross Site Scripting FAQ, CGSI Security, May 2002, 5 pages.
CERT Advisory CA-2000-02 Malicious HTML Tags Embedded in Client Web Requests, Feb. 2, 2002, pp. 1-8.
HTML Rendering Engine, printed from http://msdn.microsoft.com/library/en-us/westudio/htm/_HTML_Controls_Trident_.asp on Nov. 12, 2002, 1 page.

(Continued)

*Primary Examiner*—Kim Vu
*Assistant Examiner*—Beemnet W Dada
(74) *Attorney, Agent, or Firm*—Banner & Witcoff, Ltd.

(57) ABSTRACT

An automated method and system for testing a web site for vulnerability to a cross site scripting (XSS) attack are disclosed. The automated tool injects a tracer value into both GET and POST form data, and monitors the resultant HTML to determine whether the tracer value is returned to the local machine by the server to which it was sent. If the tracer value is returned, the automated tool attempts to exploit the web site by injecting a non-malicious script as part of an input value for some form data, based on the location in the returned HTML in which the returned tracer value was found. If the exploit is successful, as indicated by the non-malicious script, the automated tool logs the exploit to a log file that a user can review at a later time, e.g., to assist in debugging the web site.

54 Claims, 5 Drawing Sheets

OTHER PUBLICATIONS

T. Dyck, "First Crack in OpenHack", News Analysis, Eweek, p. 9, Oct. 28, 2002.

Cross-Site Scripting Security Exposure Executive Summary, printed from http://www.microsoft.com/technet/security/topics/exsumcs.asp?frame=true on Nov. 9, 2002, 3 pages.

Sanctum Inc.—Save Your Site, printed from http://www.sanctuminc.com/solutions/appscan/index.html on Nov. 9, 2002, 2 pages.

Sanctum, Web Application Security Testing, © 2002, 2 pages.

WhiteHat Community printed from http://community.whitehatsec.com/wharsenal/02/03/06/1856227.shtml on Nov. 9, 2002, 4 pages.

A. Klein, "Cross Site Scripting Explained", Sanctum, Jun. 2002, 10 pages.

Perl.com: Preventing Cross-site Scripting Attacks [Feb. 20, 2002], printed from http://www.perl.com/pub/a/2002/02/20/css.html on Nov. 9, 2002, 6 pages.

D. Scott, et al., "Abstracting Application-Level Web Security", WWW 2002, May 7-11, 2002, p. 396-407.

* cited by examiner

Http://www.goodguy.com/hello.asp?name=Tom

FIG. 1

```
<HTML>
<HEAD>
    <TITLE>Hello Example</TITLE>
</HEAD>
<BODY>
Hello, Tom.
</BODY>
</HTML>
```

FIG. 2 http://www.goodguy.com/hello.asp?name=<SCRIPT>some-evil-JavaScript-goes-here;</SCRIPT>

FIG. 3

```
<HTML>
<HEAD>
    <TITLE>Hello Example</TITLE>
</HEAD>
<BODY>
Hello, <SCRIPT>some-evil-JavaScript-goes-here;</SCRIPT>.
</BODY>
</HTML>
```

FIG. 7 http://netscan.research.microsoft.com/Netscan/Frames/
Main_Frame.asp?email45=CSSTESTTAG&emailaddr=&NGSearch=&SearchType=&content=&strbgcolor=&NGID=&NGDate=&NGType=&NGName=

FIG. 9

<a HREF=http://www.test.com/default.asp?zip=98052 onclick="exploit-script-goes-here;">

AUTOMATED DETECTION OF CROSS SITE SCRIPTING VULNERABILITIES

FIELD OF THE INVENTION

The invention relates generally to computers and computer networks. More specifically, the invention relates to computer security and prevention of malicious attacks on a computer system by a hacker by providing for the automatic detection of a web site's vulnerability to cross-site scripting type attacks.

BACKGROUND OF THE INVENTION

The proliferation of the Internet has created a massive venue for computer hackers to attempt to disrupt web services, cripple company web sites, and exploit users' private personal information. Typical types of Internet-based attacks include buffer overflow attacks, denial-of-service attacks, and a newer class of attack termed a cross site scripting (XSS, previously known in the art as CSS) attack.

Figure 1:
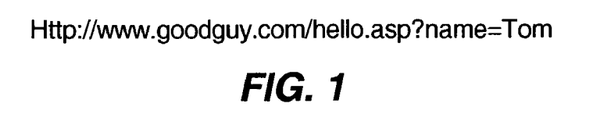
FIG. 1 illustrates a URL including expected user input
Figure 2:
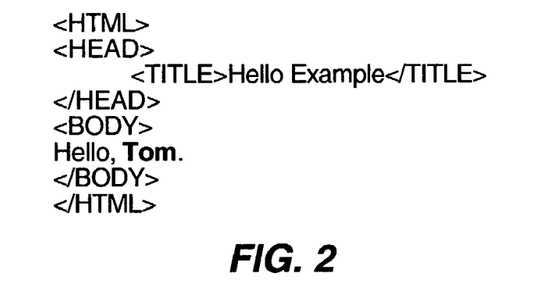
FIG. 2 illustrates HTML produced as a result of submitting the URL illustrated in FIG. 1.

Cross site scripting attacks exploit a server that echoes some user supplied data back to the user's client computer over HTTP or HTTPS. For example, suppose a CGI script accepts as input a person's name, such as is illustrated in FIG. 1. The CGI script might return to the client computer an HTML document that displays a message directed to that person, such as is illustrated in FIG. 2. The echoed data is boldfaced in FIG. 2 for illustrative purposes only.

Figure 3:
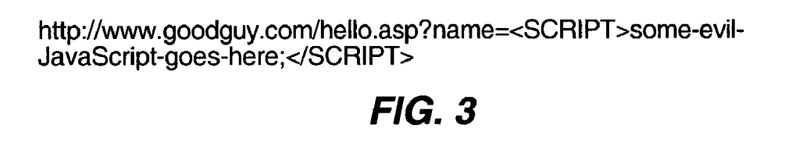
FIG. 3 illustrates a URL in which malicious code has been injected.
Figure 4:
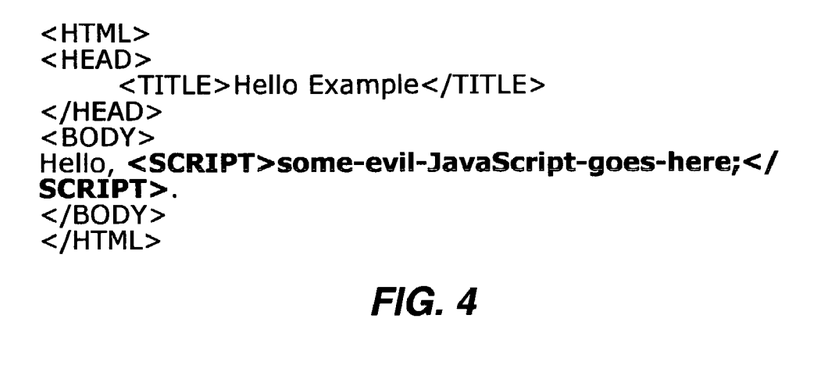
FIG. 4 illustrates HTML produced as a result of submitting the URL illustrated in FIG. 3.

A malicious user such as a hacker might be able to exploit this echoing feature to execute malicious code on a client computer. For example, a malicious user might persuade an inattentive user to click on a hyperlink corresponding to a URL such as is shown in FIG. 3. The malicious user might send the inattentive user an innocent-looking link in an unsolicited email, or might maintain a web page that many people want to visit, e.g., advertising information about a popular celebrity. In either scenario (email or web page), a hyperlink is supplied that corresponds to a URL such as is shown in FIG. 3 (GET request) or an HTML form is pre-populated with malicious form data (POST request). The CGI script, upon execution at the server, returns to the client an HTML documents such as is illustrated in FIG. 4. The echoed data is boldfaced in FIG. 4 for illustrative purposes only. Because the user's Web browser receives the evil JavaScript from the trusted Web page (goodguy.com), the Web browser will execute the script and allow access to anything to which goodguy.com would otherwise have access, e.g., a cookie with the user's personal login and password, account information, credit card information, etc.

The ability to execute, on a user's local computer, a script appearing to originate from a trusted web site, but that in fact originates from a malicious user, is a serious security vulnerability. For example, the simple script alert (document- .cookie) will pop up an alert dialog box displaying the user's current set of cookies for goodguy.com. One of skill in the art will appreciate that a malicious user can do much more serious damage, including stealing passwords or other personal information stored in a cookie (e.g., credit card information), or redirecting the user to another (malicious) Web site.

While solutions for preventing cross site scripting attacks have been proposed, e.g., by performing validation on received input to ensure that the input does not contain any malicious code, or encoding characters with special meaning in HTML, there is presently no way to automate testing of a Web site for susceptibility to cross site scripting attacks. In order to test for cross site scripting vulnerabilities, a tester must manually submit test data to a Web server in the form of URLs with various test data. This manual testing is tedious and consumes unnecessary resources (i.e., man-hours).

Thus, it would be an advancement in the art to provide an automated solution for testing a Web site for susceptibility to cross site scripting type attacks. It would be a further advancement in the art to provide an automated software testing tool that checks not only for simple cross site scripting vulnerabilities, but also tests for susceptibility to advanced cross site scripting attacks. It would be a further advancement in the art if the automated software tool were able to use the same engine used by a common web browser to ensure that the site being tested will perform exactly as when a user visits the web site using the common web browser.

BRIEF SUMMARY OF THE INVENTION

To overcome limitations in the prior art described above, and to overcome other limitations that will be apparent upon reading and understanding the present specification, the present invention is directed to an automated software tool that detects a vulnerability of a web site to a cross site scripting attack. The automated software tool submits a tracer value as input to a web site, and monitors the web page returned by the web site as a result of submitting the tracer value. When the tracer value is present in the returned web page, the automated software tool knows that the web site might be vulnerable to a cross site scripting (XSS) attack. To confirm whether the web site is indeed vulnerable to a XSS attack, based on the location of the returned tracer value, the automated software tool submits a signaling script as input to the web site, and monitors the subsequently returned web page to determine whether the signaling script is executed by the local computer when the subsequently returned web page loads on the local computer. If the script is executed, the automated software tool knows that the web site is vulnerable to a XSS attack corresponding to the format of the script submitted based on the determined location of the tracer value.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION OF THE INVENTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope of the present invention.

General Operating Environment

Figure 5:
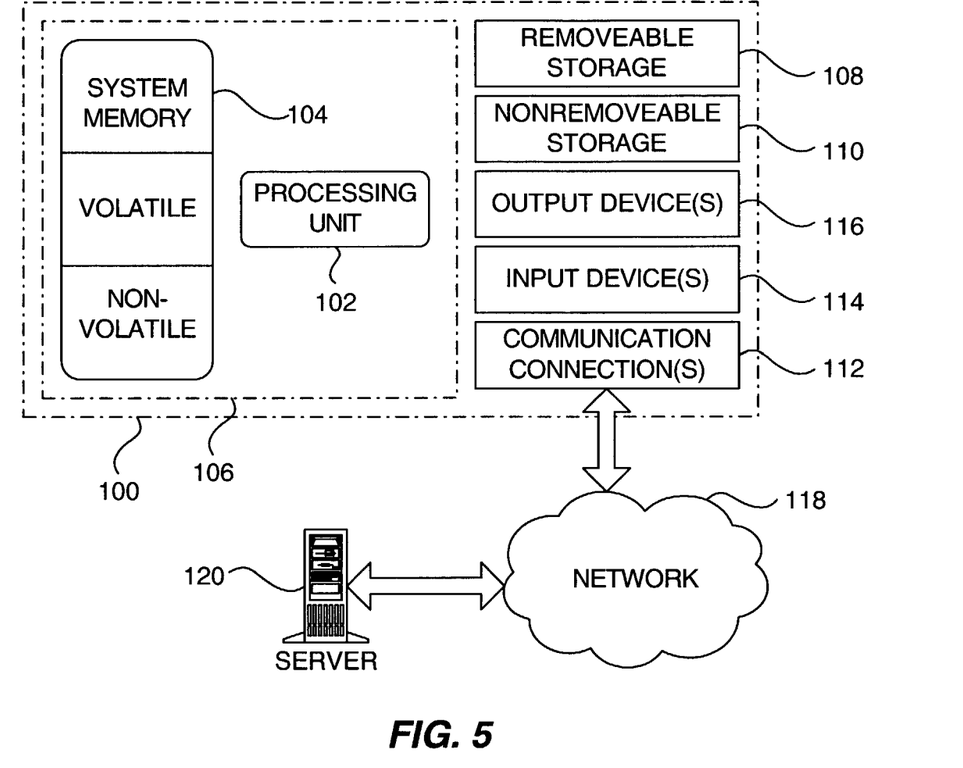
FIG. 5 illustrates an execution environment according to an illustrative embodiment of the invention.

With reference to FIG. 5, an exemplary system for implementing the invention includes a computing device, such as computing device 100. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 5 by dashed line 106. Additionally, device 100 may also have additional features/functionality. For example, device 100 may also include additional storage (removable and/or non-removable) including, but not limited to, magnetic or optical disks or tape. Such additional storage is illustrated in FIG. 5 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 100. Any such computer storage media may be part of device 100.

Device 100 may also contain communications connection(s) 112 that allow the device to communicate with other devices. Communications connection(s) 112 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, Bluetooth, RF, infrared and other wireless media. The term computer readable media as used herein includes both storage media and communication media.

Communication connection(s) 112 allow device 100 to communicate with remote devices, e.g., server 120, via one or more networks 118. Server 120 may be an application service provider's server for providing a Web service, a Web server for accessing one or more Web pages of a Web site, or any other server to which device 100, acting as a client machine, may access. Network(s) 118 may include any number and type of wired and/or wireless networks, including by way of example, the Internet, corporate intranets, LANs, WANs, and the like.

Device 100 may also have input device(s) 114 such as keyboard, mouse, pen, voice input device, touch input device, etc. Output device(s) 116 such as a display, speakers, printer, etc. may also be included. All these devices are well know in the art and need not be discussed at length here.

FIG. 5 illustrates an example of a suitable operating environment 100 in which the invention may be implemented. The operating environment 100 is only one example of a suitable operating environment and is not intended to suggest any limitation as to the scope of use or functionality of the invention. Other well known computing systems, environments, and/or configurations that may be suitable for use with the invention include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The invention may be described in the general context of computer-executable instructions, such as program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like.

Illustrative Embodiments

Figure 6:
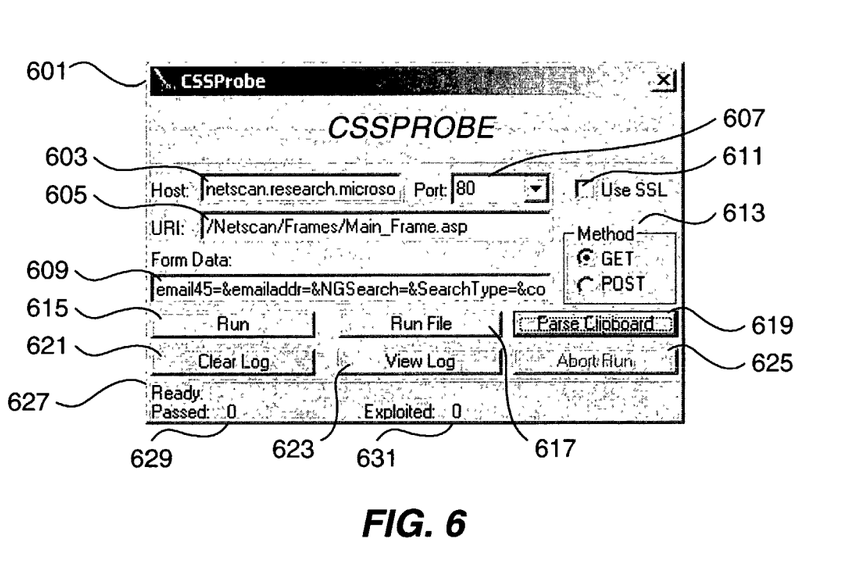
FIG. 6 illustrates a screenshot of an automated software tool according to an illustrative embodiment of the invention.
Figure 7:
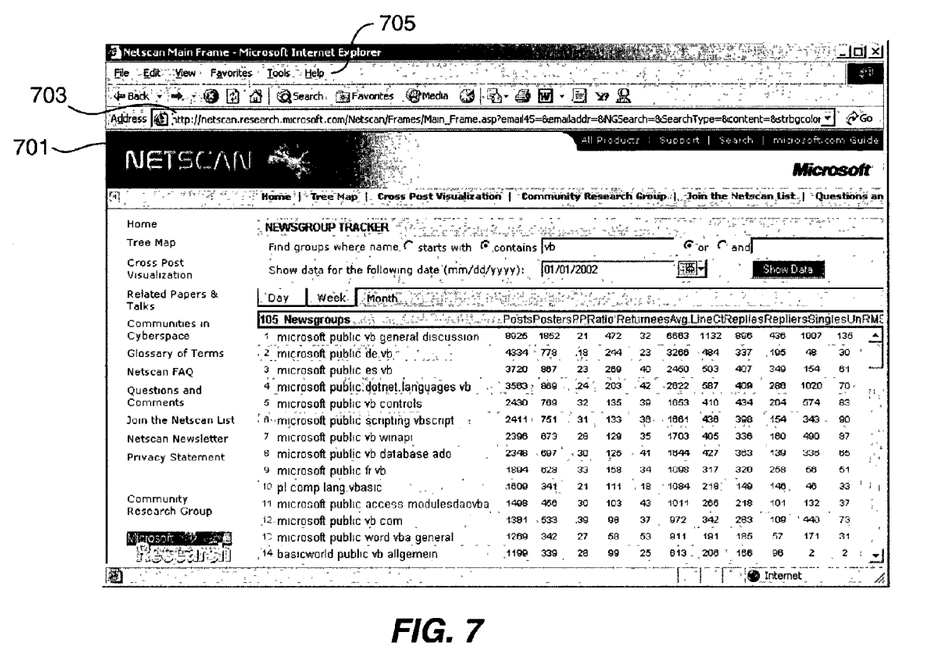
FIG. 7 illustrates a screenshot of a Web site to be tested for vulnerability to a cross site scripting attack according to an illustrative embodiment of the invention.
Figure 8:
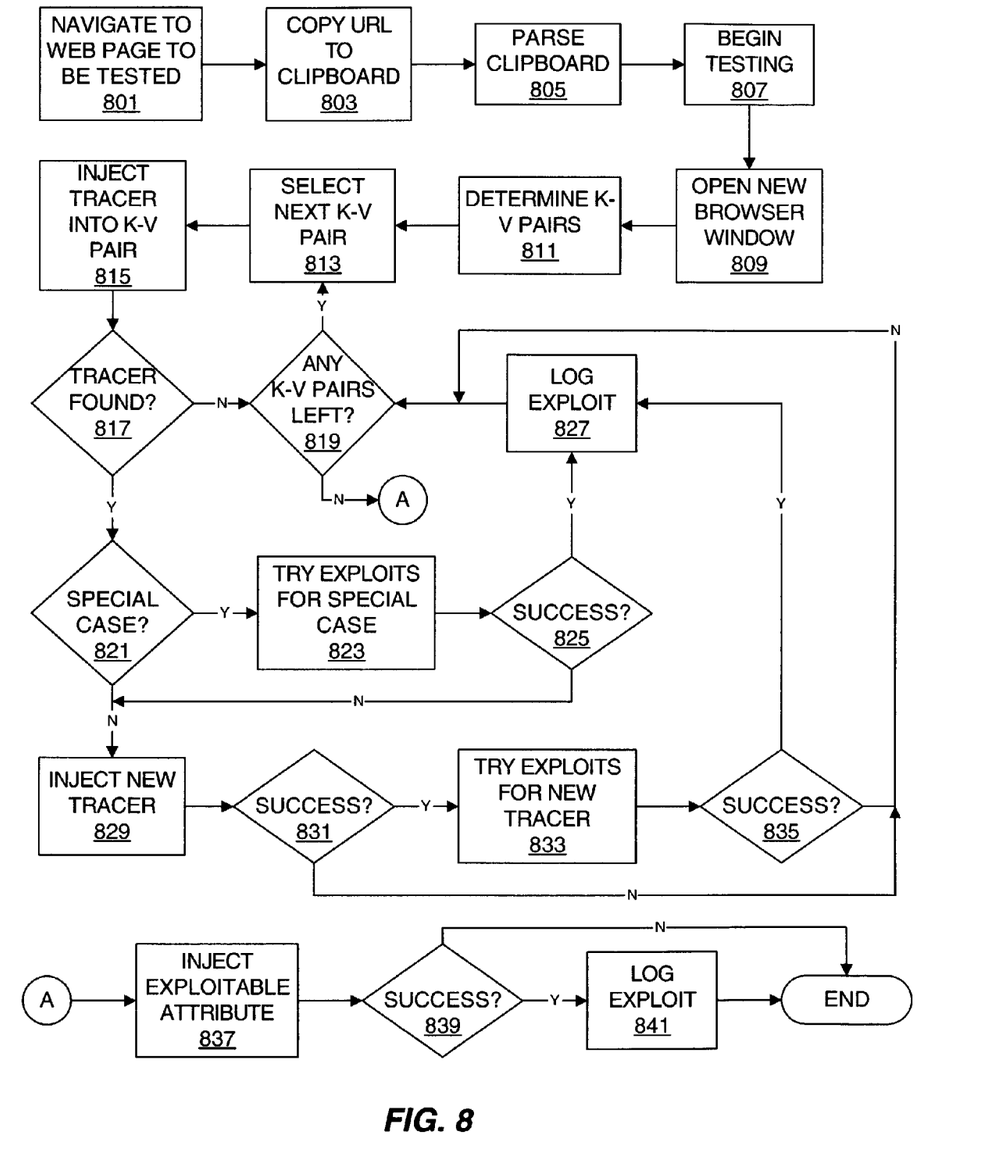
FIG. 8 illustrates a method for testing a Web site for susceptibility to cross site scripting attacks according to an illustrative embodiment of the invention.

With reference to FIGS. 6–12, the invention provides an automated software testing tool that checks a Web site's susceptibility to cross site scripting (XSS) attacks by hackers and other malicious users. FIG. 6 illustrates a main menu screenshot for the automated software tool, indicating various functionalities and options available to the user of the automated software tool. FIG. 7 illustrates a screenshot of a Web page for which a user desires to determine the susceptibility to cross site scripting type attacks. FIG. 8 illustrates a method for determining susceptibility to cross site scripting attacks as performed by an illustrative embodiment of the automated software tool. Each figure is explained in more detail, below.

FIG. 6 illustrates a main menu 601 for the automated software tool, according to an illustrative embodiment of the invention. After launching the automated software tool, a user may enter in input box 603 the host name corresponding to the web site for which the user desires to test XSS vulnerability. Similarly, the user enters the specific URI data, port number, and form data in input boxes 605, 607, and 609, respectively. The URI data 605 refers to the data after the domain name portion of the URL. The port number 607 may be any port accessible on a remote server. However, by default, port 80 is used unless otherwise specified, as port 80 corresponds to Web browser traffic. Form data 609 describes the form fields that host 603 expects to receive through URI 605 on port 607.

After entering the above Web site information, the user may specify further options, such as selecting via input box 611 whether secure socket layers (SSL) should be used. For example, some web pages are only accessible over HTTPS (a secure connection). In these cases, the user should specify SSL. For example, a login page to a web site will likely only work over SSL for security reasons. The user may also select via input box 613 whether testing should be performed using the GET or POST method. The GET method, generally, refers to including data for variables in the URL sent to a server. The POST method, generally, refers to submission of form data via a POST method through a form field of a web page. Once the Web site information and any associated options have been entered, the user launches the testing process by selecting the 'Run' button 615.

Alternatively to manually entering information for each website, the user may store in a data file information corresponding to multiple Web sites. The user can automatically test each Web site, without being required to manually enter the information for each Web site into menu 601, by selecting 'Run File' button 617. Upon selecting button 617, the user may be prompted for a file name for the file containing the information corresponding to the multiple Web sites. Alternatively, the user may be required to store the information in a file with a predetermined name, e.g., 'webdata.csv', and the automated software tool retrieves the information from the predetermined file upon selection of button 617.

According to another alternative, the user may simply copy a URL to the clipboard (not shown) of the operating system, e.g., Microsoft WINDOWS® brand operating system, which the automated software tool then parses to determine the proper Web site information for input fields 603, 605, 607, and 609. For example, suppose a user wants to test the Web site 701 illustrated in FIG. 7. The user can copy the URL 703 to the clipboard by highlighting URL 703 and either selecting Edit, Copy from menu bar 705, or typing the corresponding shortcut Ctrl-C. Referring back to FIG. 6, the user may then select the 'Parse Clipboard' button 619, which causes the automated software tool to parse the current contents of the clipboard and automatically populate input fields 603, 605, 607, and 609 with the hostname, URI, port, and form data, respectively, as is illustrated in FIG. 6. If the current contents of the clipboard do not correspond to a Web site, the automated software tool displays an error (not shown) to the user. After successfully parsing the clipboard's contents, the user may select button 615 to test Web site 701. The testing process will be explained in more detail with reference to FIG. 8, below.

If the user desires to interrupt the automated software tool before it has finished the automated testing process, the user may select 'Abort Run' button 625, which is optionally only available to the user for selection during the testing process (as shown). After the automated software tool has completed testing the web site, the user may view the resulting log file by selecting 'View Log' button 623. If the user does not need to maintain the log file or otherwise desires to delete the log file, the user can clear the log file by selecting 'Clear Log' button 621.

Other optional information may also be presented on the main menu 601. For example, status indicator 627 may indicate whether the automated software tool is ready to test a Web site (as shown), waiting for input from the user, parsing the clipboard, parsing a file containing information corresponding to multiple Web sites, testing, and the like. During and/or subsequent to testing a Web site, indicator 629 may indicate how many tests the current Web site has passed, and indicator 631 may indicate how many tests the current Web site has failed (i.e., different ways in which the automated software tool has exploited the current Web site, and is thus susceptible to XSS attacks).

FIG. 8 illustrates a method for testing a Web site for susceptibility to XSS-type attacks, according to an illustrative embodiment of the invention. Initially, in step 801, a user navigates to a Web site to be tested. In step 803, the user copies the URL of the Web site to the clipboard, and in step 805 selects the 'Parse Clipboard' button on the automated software tool, causing the automated software tool to parse the clipboard and populate the Web site information fields as described above. The automated software tool starts testing when the user selects the 'Run' button in step 807. One of skill in the art will appreciate that, alternatively to steps 801–807, a user may manually enter information in the main menu of the automated software tool (FIG. 6) or may specify in an input file multiple Web sites to test, as described above. For illustrative purposes only, only one Web site being tested is described herein.

In step 809, the automated software tool opens a new browser window in which to test the subject Web site. In step 811, the automated software tool parses the form data 609 (FIG. 6) into key-value pairs. Each key-value pair is separated with an ampersand (&), while the name of the key and its corresponding value are separated with an equals sign (=). In the example illustrated in FIGS. 6 and 7, each key has a null value. However, if the value "hacking" were specified for the key NGSearch, it might look like "email45=&emailaddr=&NGSearch=hacking&SearchType=& . . ."

The automated software tool proceeds to check the web site's vulnerability to XSS attacks based on each key-value pair. That is, the automated software tool initially tests vulnerability based on the first key-value pair, then proceeds to the second key-value pair, etc., until all key-value pairs have been tested. Thus, in step 813 the automated software tool selects the first (or next) key-value pair, referred to as the current key-value pair.

Figure 9:
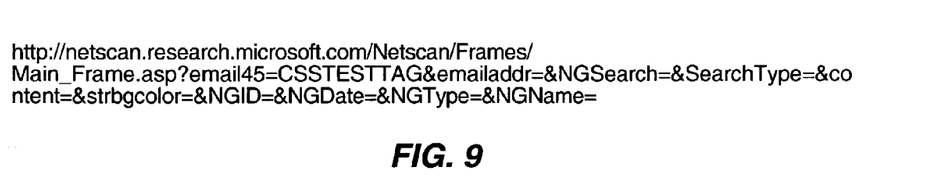
FIG. 9 illustrates a test URL used by the automated software tool according to an illustrative embodiment of the invention.

For each current key-value pair, the automated software tool performs steps 815–835. In step 815, the automated software tool injects a plain text tracer, e.g., CSSTESTTAG, as the value of the current key-value pair, and submits the resulting URL via the new browser window opened in step 809. For example, assuming the current key-value pair is the first key-value pair, the automated software tool initially submits in step 815 the URL illustrated in FIG. 9. In step 817, the automated software tool receives HTML data back from the Web server to which the URL was submitted (e.g., server 120, FIG. 5), and the automated server tool scans the HTML to check whether the tracer value was returned by the server. In one illustrative embodiment of the invention, in order to ensure that the web site being scanned will behave exactly as in a user's browser window, the automated software tool scans the document object model (DOM) of the web page. The DOM of the returned HTML web page is exposed by Internet Explorer's HTML Rendering Engine (e.g., using mshtml.dll, dispex.dll, iesetup.dll, mshtml.tlb, mshtmled.dll, and mshtmler.dll). If the tracer value is not found in the DOM then the automated software tool determines in step 819 whether any key-value pairs are left and, if so, returns back to step 813. If there are no remaining key-value pairs, the automated software tool proceeds to step 837.

If the tracer value is not found within the HTML DOM, then the tool proceeds to step 819. However, if the tracer value is found within the HTML DOM, the automated software tool also analyzes in step 817 where the tracer value was found. Next, in step 821, the automated software tool determines whether the location in which the tracer value was found corresponds to a special case for which a known exploit exists. If so, the automated software tool attempts in step 823 to exploit the Web site's vulnerability to a cross site scripting attack based on the location in which the tracer value was found in step 817. If no special case exists, the automated software tool proceeds to step 829 to attempt to exploit the web site using a different tracer value to inject a custom HTML tag into the DOM.

Examples of locations that are indicative of known exploits include, but are not limited to, the following:

1) Tracer value returned as text displayed in body of web page.

When the tracer value is returned as displayed text in the body of the returned web page, the automated software tool determines that a cross site scripting attack, if the web site is vulnerable, can be completed by injecting a script as-is as the value of the current-key value pair, meaning that the automated software tool can inject a script in the form "<script>exploit-script-goes-here;</script>" (without the enclosing quotation marks).

2) Tracer value returned in an HTML tag.

When a tracer value is returned in an HTML tag, the resulting HTML may appear similar to the following illustration where the tracer value was submitted as an input value:

<INPUT type="text" value="CSSTESTTAG">

However, one will note that the 'INPUT' tag is not closed prior to encountering the tracer value. Thus, the automated software tool determines that a cross site scripting attack, if the web site is vulnerable, can be completed by injecting a script preceded by tag closing indicia, e.g., in the form "><SCRIPT>exploit-script-goes-here;</SCRIPT>" (without quotation marks).

Figure 10:
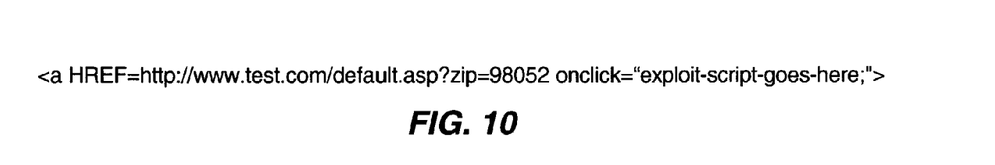
FIG. 10 illustrates HTML returned by a server after the automated software tool has attempted an exploit according to an illustrative embodiment of the invention.

On some web sites, it might not be possible to close the preceding tag, but rather attributes can be added. Thus, the automated software tool may also attempt to add attributes to the value. For example where the tracer is returned in the HTML "<A HREF=www.test.com/default.asp?zip=> sending the zip code value "90210 onclick="exploit-script-goes-here;"" (without outside quotation marks). The resulting HTML might look like that illustrated in FIG. 10. Clicking on the resulting link would then launch the injected script.

3) Tracer value returned as attribute of IMG or A HREF tag.

"IMG," "A," and several other tags allow a URL to be specified as an attribute. Thus, the automated software tool determines that a cross site scripting attack, if the web site is vulnerable, can be completed by injecting a script protocol as the URL. For example javascript:exploit-script-goes-here, vbscript:exploit-script-goes-here, etc. In some instances, a web site may use user-supplied input as a portion of an IMG SRC attribute. That is, a web site may base a resultant file name on user input, e.g., the input value 'CSSTESTTAG' may result in the tag "<IMG SRC=fooCSSTESTTAG.jpg>" (without quotation marks). Thus, the automated software tool determines that a cross site scripting attack, if the web site is vulnerable, can be completed by injecting a script preceding the ".jpg>"

4) Tracer value returned as part of a block of script.

Sometimes the tracer value may be inserted into a block of script. In this case, it is not necessary to include the SCRIPT tag with the script input. This attack does require, however, that the returned data be a syntactically correct script. For example, a web page to tell users they are about to enter a part of the site where viewer discretion is advised may include a redirect value for the page to which the user should be redirected. The URL for the page might look like:

http://www.test.com/blabla/
acssrv.dll?action=acwarning&redir_url=%2Fisapi%2Facssrv%2Edll%3Faction%3Derror%26commid%3D One of the parameters passed in the URL is the redir_url. The user-supplied data may be returned inside of a SCRIPT tag, such as "var Request_redir_url='/isapi/acssrv.dll?action=error&commid=';". The value for the redir_url from the URL becomes the value of the JavaScript variable named Request_redir_url. The automated software tool determines that a cross site scripting attack, if the web site is vulnerable, can be completed by injecting a script at the end of the URL without SCRIPT tags, e.g., with a URL such as:

http://www.test.com/isapi/
acssrv.dll?action=acwarning&c=&redir_url=%2Fisapi%2Facssrv%2Edll%3Fraction%3Derror%26commid%3D';
some-evil-JavaScript-goes-here;var%20strBogus='gotcha When the automated software tool sends the above URL, the following is returned to the browser inside of the SCRIPT tag:

"var Request_redir_url='/isapi/acssrv.dll?action=error&commid=';alert("Cross-siteScriptingVulnerabilityFoundByCSSProbe.");var strBogus='gotcha"

The automated software tool successfully injects the script (i.e., alert("Cross-siteScriptingVulnerabilityFoundByCSSProbe.")), by including "var strBogus='gotcha" after it because some web servers (e.g., MSN) always append "';" after the user-supplied data. The automated software tool makes the script syntactically correct by declaring a new variable named strBogus so as to avoid a script error.

5) Tracer value is returned in HTML comments.

Sometimes the user-supplied data (i.e., the tracer value) is returned inside of an HTML comment, e.g., the CGI script returns an error and uses the user input for debugging purposes. However, the comment field is not closed prior to encountering our tracer value CSSTESTTAG. Thus, the automated software tool determines that a cross site scripting attack, if the web site is vulnerable, can be completed by injecting a script preceded by comment closing indicia, e.g., in the form "--> <SCRIPT>exploit-script-goes-here;</SCRIPT>" (without quotation marks).

6) Tracer value not located in a location for which there is a known exploit

In some instances the tracer value may be found in the DOM in a location for which there is not a known exploit. In such situations, the automated software tool may attempt to exploit the web site by injecting a STYLE attribute. While the automated software tool may inject other attributes based on the tracer value being found in other specific locations, the STYLE attribute is used as a default, or fall-back, attempt because the STYLE attribute is common to many HTML tags. Thus, the automated software tool may attempt various exploits by injection the STYLE attribute in various formats, such as 'STYLE=, "STYLE=, and the like.

The above scenarios are meant by way of illustration only, and should not be interpreted as limiting the automated software tool to only those scenarios. Those of skill in the art will appreciate that other scenarios may be known or later discovered, and the automated software tool may be adapted to account for such other scenarios.

Figure 11:
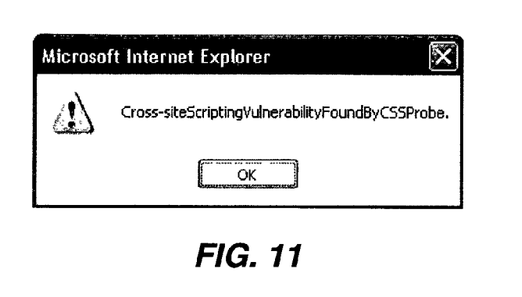
FIG. 11 illustrates an alert window displayed by the automated software tool according to an illustrative embodiment of the invention.

Referring back to FIG. 8, the automated software tool attempts in step 823 to exploit the web site by injecting a non-malicious script as described above. In an illustrative embodiment of the invention, a script such as <SCRIPT>alert("Cross-siteScriptingVulnerability-FoundByCSSProbe.")</SCRIPT> is used. Any other readily identifiable text may alternatively be used. Thus, if the exploit is successful, the resulting HTML returned to the browser window will cause a pop up window to display the text "Cross-siteScriptingVulnerabilityFoundByCSSProbe," such as is illustrated in FIG. 11. In step 825, the automated software tool determines whether the exploit succeeded by monitoring the local system for the pop up window. If the pop up window is not displayed within a predetermined amount of time, e.g., by the time the returned HTML has finished loading or shortly thereafter, the automated software tool determines that the exploit was unsuccessful and proceeds to step 829. If, however, the pop up window is displayed within the predetermined amount of time, the automated software tool determines that the exploit was successful, and proceeds to step 827 where exploit data is written to the log file with information sufficient to identify the type of XSS attack to which the web site is susceptible. The log file may be reviewed by a user at a later time, e.g., to assist in debugging the subject web site.

Figure 12:
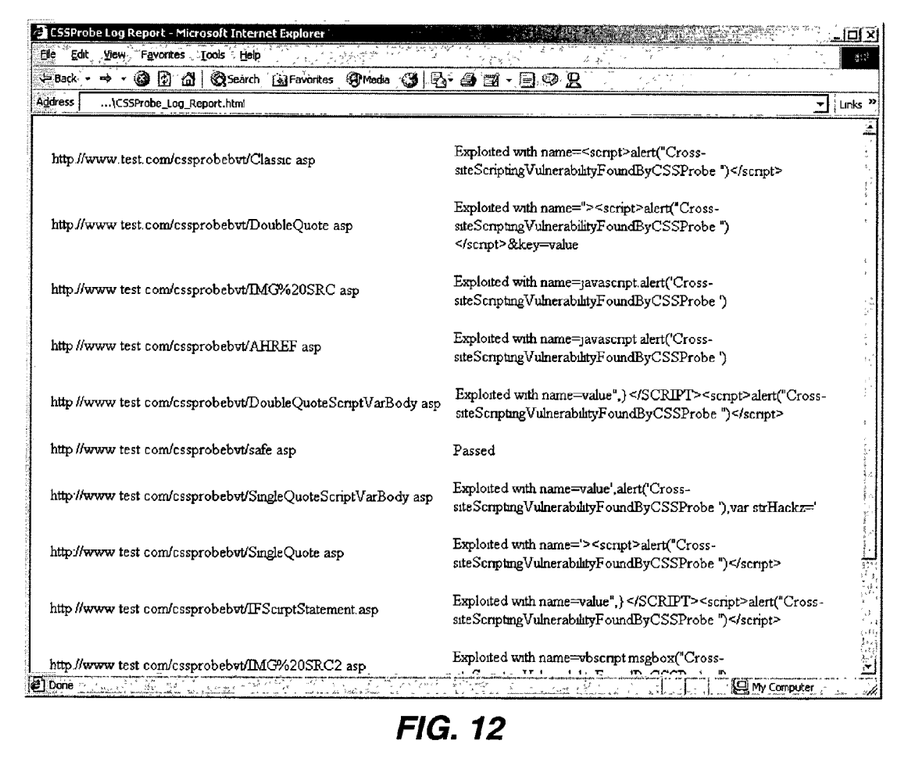
FIG. 12 illustrates a portion of a log file generated by the automated software tool according to an illustrative embodiment of the invention.

For example, in one embodiment, with reference to FIG. 12, the log file is written as an HTML document which a user can review upon completion of the testing cycle. Each entry in the log file may appear as a row in a table, and entries may be color coded to indicate whether each web page is vulnerable or safe. Those of skill in the art will appreciate that the log file may be any type of file sufficient to indicate to a user the type of exploit to which each Web page is vulnerable. After logging the exploit in step 827, the automated software tool returns to step 819.

In step 829, the automated software tool injects a tag-based tracer value, based on the results of the exploits attempted in step 823. For example, if the automated software tool does not find the tracer value, in step 817, in a tag attribute that it knows how to exploit, the automated software tool will attempt to add a tag to the DOM, e.g., <CSSTESTTAG>. The automated software tool sends <CSSTESTTAG> first because it is typically the most likely tag to succeed at exploiting a web site. The automated software tool may also attempt to exploit the web site using tags such as "><CSSTESTTAG>, '><CSSTESTTAG>, and other syntactic variations attempting to get the tag into the resulting DOM. Once the tag is found within the DOM, the automated software tool replaces <CSSTESTTAG> with the script tag and the non-malicious script exploit code. In step 831 the automated software tool checks the returned HTML and/or DOM to determine whether the server returned the new tracer tag in the returned web page. If so, the automated software tool proceeds to step 833. If not, the automated software tool proceeds to step 819.

In step 833, because the new tracer value was returned by the server, the automated software tool attempts to exploit the web site by sending the exploit script, again based on the location of the new tracer value in the returned web page. In step 835, the automated software tool determines whether the exploit was a success based on whether the pop up window appears within the predetermined amount of time. If the exploit in step 833 was a success, the automated server tool proceeds to step 827 where the exploit is logged to the log file. If the exploit is not a success, the automated software tool proceeds to step 819.

In step 837 the automated software tool attempts to exploit the web site by inserting an exploitable attribute into the DOM. That is, some web sites, while not explicitly advertising that they accept key-value pairs, will accept a key-value pair if one is submitted. For example, a web site with the URL 'http://www.test.com/main.asp' does not appear to accept any key-value pairs. However, when the URL 'http://www.test.com/main.asp?name=CSSTESTTAG' is submitted, the resulting HTML or DOM may contain the tracer value 'CSSTEST-TAG.' Thus, the automated software tool determines that a cross site scripting attack, if the web site is vulnerable, can be completed by injecting a script based on the location of the attribute tracer value, as described above. The automated software tool, in step 839, determines whether the attribute attack was a success based on whether the pop up window appears within the predetermined amount of time. If the attack is a success, the automated software tool logs the exploit in step 841, similar to logging step 827.

Those of skill in the art will appreciate that the method illustrated in FIG. 8 may be modified without departing from the scope and spirit of the invention. That is, some steps in FIG. 8 may be performed in other than the recited order, one or more steps may be optional, additional steps may be inserted, and some steps may be combined, all while performing substantially the same function as described above. For example, FIG. 8 indicates that once an exploit for a key-value pair is found the automated software tool proceeds to the next key-value pair. This is because the automated software tool makes an intelligent decision as to the type of exploit required based on the location of the returned tracer value. That is, the automated software tool makes an intelligent decision whether the injected script should be preceded by ">," "-->," ".jpg>," ".jpg STYLE=," null, or the like, based on the tracer value's returned location. However, one of skill in the art will appreciate that, in an alternative illustrative embodiment, the automated software tool may attempt to exploit each key-value pair by iteratively attempting each script format. That is, brute force may alternatively be used. In yet another alternative illustrative embodiment, the automated software tool may halt testing as soon as a first vulnerability is detected.

As illustrated in FIG. 6, the automated software tool can also test a web site's vulnerability to XSS attacks using the known POST command. Often web pages containing forms through which a POST command can be sent include error checking within the form in the web page itself. That is, often error checking is performed locally on the client computer before the data is sent to the server. In such a scenario, included in the error checking may be validation of input data to ensure that the input values do not contain SCRIPT or other illegal or potentially malicious tags. However, in order to circumvent the locally-performed error checking, as would a malicious user, the automated software tool parses the form to determine the values actually returned to the server, and creates a duplicate page that performs no error checking. The automated software tool then performs the above analysis, such as is illustrated in FIG. 8, on the web site using the duplicated web page that performs no error checking.

The above-described automated software tool is a powerful tool to identify vulnerabilities in web sites. If the tool is obtained by a malicious user, the malicious user could exploit the automated software tool itself to identify weaknesses in various web sites. Thus, to prevent unauthorized or malicious users from taking advantage of the automated software tool's capabilities, in one illustrative embodiment of the invention the automated software tool, during initialization, checks to determine whether it is being executed from a predetermined, or home, network. For example, the automated software tool may check to determine that it is being executed from within a corporate intranet by confirming that it can ping a predetermined corporate server that is only accessible from within the corporate intranet. If the automated software tool cannot contact the predetermined corporate server, the automated software tool may shut down or refuse to test any web sites.

Alternatively, in order to ensure that the automated software tool is not used on arbitrary web sites, the automated software tool may be hardcoded to only test web sites falling within a predetermined list of domain names, hosts, and/or URIs. If the user attempts to test a web site not falling within the predetermined list of web sites, the automated software tool may shut down or refuse to test the desired web site.

While the invention has been described with respect to specific examples including presently preferred modes of carrying out the invention, those skilled in the art will appreciate that there are numerous variations and permutations of the above described systems and techniques. Thus, the spirit and scope of the invention should be construed broadly as set forth in the appended claims.

I claim:

1. A computer-performed method for automated detection of a cross site scripting vulnerability of a web site, comprising:
   determining key-value pairs corresponding to the web site;
   for each determined key-value pair, at least until a first vulnerability is detected, performing a sub-method comprising:
      submitting the key-value pair to the web site, wherein the value of the key-value pair comprises a tracer value;
      receiving a web page responsive to the submitted key-value pair;
      determining a location of the tracer value, when present, in the received web page; and
      when the tracer value is present in the received web page, submitting a second key-value pair to the web site, wherein the value of the second key-value pair comprises a script.

2. The computer-performed method of claim 1, wherein the script, if executed, signifies that the web site is vulnerable to a cross site scripting attack, and wherein a format of the script-comprised value of the second key-value pair is based on the determined location of the tracer value.

3. The computer-performed method of claim 1, further comprising writing vulnerability data corresponding to the web page to a log file, based on whether the script is executed.

4. The computer-performed method of claim 2, wherein the location of the tracer value is determined based on a document object model of the web page.

5. The computer-performed method of claim 4, wherein when the location of the tracer value is within displayed text of a body of the web page, the format of the script-comprised value begins with a script tag.

6. The computer-performed method of claim 4, wherein when the location of the tracer value is within an HTML tag, the format of the script-comprised value begins with indicia that closes the HTML tag.

7. The computer-performed method of claim 6, wherein when the location of the tracer value is within an IMG tag, the format of the script-comprised value begins with a graphical file extension.

8. The computer-performed method of claim 4, wherein when the location of the tracer value is within a script block, the format of the script-comprised value does not begin with a <SCRIPT> tag.

9. The computer-performed method of claim 6, wherein when the location of the tracer value is within a comment field, the format of the script-comprised value begins with "-->".

10. The computer-performed method of claim 1, further comprising:
   prior to performing the sub-method, determining whether the web site falls within a range of allowed web sites; and
   if the web site does not fall within the range of allowed web sites, halting execution of the computer-performed method.

11. The computer-performed method of claim 1, further comprising:
   prior to performing the sub-method, determining whether the computer performing the method is located on a home network; and
   if the computer performing the method is not located on the home network, halting execution of the computer-performed method.

12. The computer-performed method of claim 1, wherein web site information from which the key-value pairs are determined is received via a clipboard of the computer's operating system.

13. The computer-performed method of claim 1, wherein web site information from which the key-value pairs are determined is received via an input file comprising a listing of multiple web sites to be tested.

14. The computer-performed method of claim 1, further comprising:
   when the web site has no corresponding key-value pairs, submitting to the web site a third key-value pair, wherein the value of the third key-value pair comprises a script that, if executed, signifies that the web site is vulnerable to a cross site scripting attack.

15. The computer-performed method of claim 1, wherein the key-value pairs are submitted via a form.

16. The computer-performed method of claim 15, wherein the key-value pairs are submitted via a POST command.

17. The computer performed method of claim 1, wherein the key-value pairs are submitted via a URL.

18. The computer-performed method of claim 17, wherein the key-value pairs are submitted via a GET method.

19. A computer-readable storage medium storing computer readable instructions that, when executed, cause a computer to perform a method for automated detection of a cross site scripting vulnerability of a web site, comprising:
- determining key-value pairs corresponding to the web site;
- for each determined key-value pair, at least until a first vulnerability is detected, performing a sub-method comprising:
  - submitting the key-value pair to the web site, wherein the value of the key-value pair comprises a tracer value;
  - receiving a web page responsive to the submitted key-value pair;
  - determining a location of the tracer value, when present, in the received web page; and
  - when the tracer value is present in the received web page, submitting a second key-value pair to the web site, wherein the value of the second key-value pair comprises a script.

20. The computer-readable storage medium of claim 19, wherein the script, if executed, signifies that the web site is vulnerable to a cross site scripting attack, and wherein a format of the script-comprised value of the second key-value pair is based on the determined location of the tracer value.

21. The computer-readable storage medium of claim 19, wherein the computer readable instructions further comprise writing vulnerability data corresponding to the web page to a log file, based on whether the script is executed.

22. The computer-readable storage medium of claim 20, wherein the location of the tracer value is determined based on a document object model of the web page.

23. The computer-readable storage medium of claim 22, wherein when the location of the tracer value is within displayed text of a body of the web page, the format of the script-comprised value begins with a script tag.

24. The computer-readable storage medium of claim 22, wherein when the location of the tracer value is within an HTML tag, the format of the script-comprised value begins with indicia that closes the HTML tag.

25. The computer-readable storage medium of claim 24, wherein when the location of the tracer value is within an IMG tag, the format of the script-comprised value begins with a graphical file extension.

26. The computer-readable storage medium of claim 22, wherein when the location of the tracer value is within a script block, the format of the script-comprised value does not begin with a <SCRIPT> tag.

27. The computer-readable storage medium of claim 24, wherein when the location of the tracer value is within a comment field, the format of the script-comprised value begins with "-->".

28. The computer-readable storage medium of claim 19, wherein the computer readable instructions further comprise:
- prior to performing the sub-method, determining whether the web site falls within a range of allowed web sites; and
- if the web site does not fall within the range of allowed web sites, halting execution of the computer-performed method.

29. The computer-readable storage medium of claim 19, wherein the computer readable instructions further comprise:
- prior to performing the sub-method, determining whether the computer performing the method is located on a home network; and
- if the computer performing the method is not located on the home network, halting execution of the computer-performed method.

30. The computer-readable storage medium of claim 19, wherein web site information from which the key-value pairs are determined is received via a clipboard of the computer's operating system.

31. The computer-readable storage medium of claim 19, wherein web site information from which the key-value pairs are determined is received via an input file comprising a listing of multiple web sites to be tested.

32. The computer-readable storage medium of claim 19, further comprising:
- when the web site has no corresponding key-value pairs, submitting to the web site a third key-value pair, wherein the value of the third key-value pair comprises a script that, if executed, signifies that the web site is vulnerable to a cross site scripting attack.

33. The computer-readable storage medium of claim 19, wherein the key-value pairs are submitted via a form.

34. The computer-readable storage medium of claim 33, wherein the key-value pairs are submitted via a POST command.

35. The computer-readable storage medium of claim 19, wherein the key-value pairs are submitted via a URL.

36. The computer-readable storage medium of claim 35, wherein the key-value pairs are submitted via a GET method.

37. A computer system comprising:
- a processor; and
- memory storing computer readable instructions that, when executed by the processor, cause the computer system to perform a method for automated detection of a cross site scripting vulnerability of a web site, comprising:
- determining key-value pairs corresponding to the web site;
- for each determined key-value pair, at least until a first vulnerability is detected, performing a sub-method comprising:
  - submitting the key-value pair to the web site, wherein the value of the key-value pair comprises a tracer value;
  - receiving a web page responsive to the submitted key-value pair;
  - determining a location of the tracer value, when present, in the received web page; and
  - when the tracer value is present in the received web page, submitting a second key-value pair to the web site, wherein the value of the second key-value pair comprises a script.

38. The computer system of claim 37, wherein the script, if executed, signifies that the web site is vulnerable to a cross site scripting attack, and wherein a format of the script-comprised value of the second key-value pair is based on the determined location of the tracer value.

39. The computer system of claim 37, wherein the computer readable instructions further comprise writing vulnerability data corresponding to the web page to a log file, based on whether the script is executed.

40. The computer system of claim 38, wherein the location of the tracer value is determined based on a document object model of the web page.

41. The computer system of claim 40, wherein when the location of the tracer value is within displayed text of a body of the web page, the format of the script-comprised value begins with a script tag.

42. The computer system of claim 40, wherein when the location of the tracer value is within an HTML tag, the format of the script-comprised value begins with indicia that closes the HTML tag.

43. The computer system of claim 42, wherein when the location of the tracer value is within an IMG tag, the format of the script-comprised value begins with a graphical file extension.

44. The computer system of claim 40, wherein when the location of the tracer value is within a script block, the format of the script-comprised value does not begin with a <SCRIPT> tag.

45. The computer system of claim 42, wherein when the location of the tracer value is within a comment field, the format of the script-comprised value begins with "-->".

46. The computer system of claim 37, wherein the computer readable instructions further comprise:
prior to performing the sub-method, determining whether the web site falls within a range of allowed web sites; and
if the web site does not fall within the range of allowed web sites, halting execution of the computer-performed method.

47. The computer system of claim 37, wherein the computer readable instructions further comprise:
prior to performing the sub-method, determining whether the computer performing the method is located on a home network; and
if the computer performing the method is not located on the home network, halting execution of the computer-performed method.

48. The computer system of claim 37, wherein web site information from which the key-value pairs are determined is received via a clipboard of the computer's operating system.

49. The computer system of claim 37, wherein web site information from which the key-value pairs are determined is received via an input file comprising a listing of multiple web sites to be tested.

50. The computer system of claim 37, further comprising:
when the web site has no corresponding key-value pairs, submitting to the web site a third key-value pair, wherein the value of the third key-value pair comprises a script that, if executed, signifies that the web site is vulnerable to a cross site scripting attack.

51. The computer system of claim 37, wherein the key-value pairs are submitted via a form.

52. The computer system of claim 51, wherein the key-value pairs are submitted via a POST command.

53. The computer system of claim 37, wherein the key-value pairs are submitted via a URL.

54. The computer system of claim 53, wherein the key-value pairs are submitted via a GET method.

* * * * *